Patented May 22, 1928.

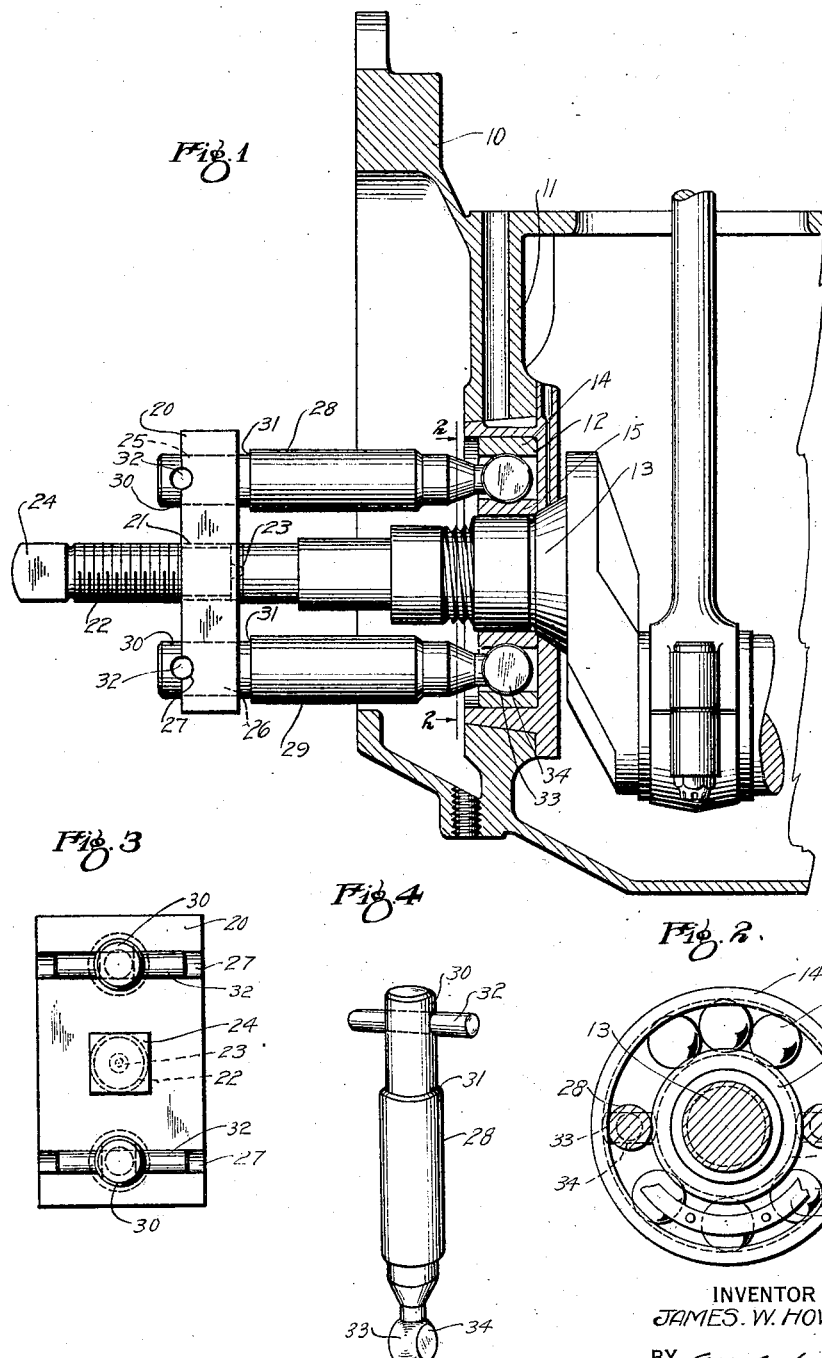

1,670,573

UNITED STATES PATENT OFFICE.

JAMES W. HOWELL, OF CLEVELAND, OHIO, ASSIGNOR TO THE WHITE MOTOR COMPANY, OF CLEVELAND, OHIO, A CORPORATION OF OHIO.

BEARING PULLER.

Application filed December 1, 1926. Serial No. 151,922.

This invention relates to bearing pullers and particularly to a mechanism adapted to remove ball bearing races which are held in frictional securement on their seats.

One object of this invention is to provide a tool which will facilitate an equalized retractive effort on both the inner and outer ball races of an anti-friction bearing.

Another object of the invention is to provide a tool for removing bearings which may be adjusted in an operative position and positively held in that position while the tool is in use.

Other objects more or less ancillary to the foregoing, and the manner in which the various objects are attained, will be pointed out in the following description.

In the accompanying drawings, which show the preferred form of construction embodying the invention, Figure 1 is a sectional view of a portion of an engine employing an anti-friction bearing and including an elevational view of the tool embodying this invention.

Figure 2 is a section on the line 2—2 of Figure 1, illustrating the mode of assembling the bearing puller with an anti-friction bearing.

Figure 3 is a plan view of the bearing puller.

Figure 4 is a detail view in perspective illustrating one of the elements of this device.

Referring to the drawings in which like symbols designate corresponding parts throughout each of the several views, 10 represents an engine crank case having a transversely disposed wall 11, in which there is mounted an anti-friction bearing 12, which is adapted to support a crank shaft 13. The anti-friction bearing is one of the conventional types comprising an outer ball race 14, an inner race 15, balls 16, and separator plates 17. The ball race 14, is formed in the usual way with an internal annular groove 18, and the inner ball race 15, is provided with a peripheral groove 19, both the grooves conforming to the contour of the balls which rotate therein.

The bearing puller as illustrated in the present case, comprises a rectilinear plate 20, centrally apertured at 21, and threaded to receive a threaded spindle 22, which is formed with a conical tip 23, at its lower end and a head 24, at its upper end which may be square or of any suitable angular configuration to receive a wrench by which it may be turned. The plate 20, is also apertured near its ends at 25 and 26, and conjoining each of these apertures there is a transversely disposed groove 27. The apertures 25 and 26, are provided to retain the engaging elements or fingers 28 and 29, respectively, each of which is formed with a reduced shank portion 30, adapted to afford its free passage within the aperture and inseparably retained therein by the shoulder 31, and a pin 32, which is transversely disposed and rigidly affixed to the finger near the end of the shank 30. The length of the shank 30, between the shoulder 31 and the pin 32, is proportioned, relative to the plate 20, to permit vertical adjustment of the finger so that the pin may be seated within the groove 27, or freely retracted therefrom.

The free ends of the fingers 28 and 29, are formed with enlarged spherical heads 33, having diametrically opposite flattened portions 34, which are disposed at right angles to the medial axis of the pin 32. The diameter of each spherical head 33, is substantially equal to that of the balls 16, in the anti-friction bearing and the width of the flattened portion is consonant with the radial opening between the inner and outer ball races so that the spherical head 33, may be inserted between the races and then adjusted to inter-connect the spherical portion of the head 33, with the grooves 18 and 19, in the heavy races.

Referring now to Figure 2, when one of the balls becomes broken or the bearing is otherwise injured and rendered useless, the ball separator 17, is first chipped away or so mutilated as to permit the balls to be crowded together substantially as illustrated. The spherical heads of the fingers 28 and 29, are then inserted between the inner and outer ball races, and adjusted into interlocking position with the grooves 18 and 19. The plate 20, is next slightly retracted until the pins 32 are seated within the grooves 27, which position obviously locks the fingers against rotation and assures the relative radial alignment of the spherical head with diametric axis of the bearing races.

The conical tip of the threaded spindle 22, may next be adjusted against the end of the shaft 13, then as the threaded spindle is rotated a tension will be effected upon the fingers which will be equally imparted to the inner and outer bearing races, thus causing the simultaneous separation of the inner race from its shaft and the outer race from the opening in which it is held.

Although the foregoing description is necessarily of a detailed character, in order that the invention may be completely set forth, it is to be understood that the specific terminology is not intended to be restrictive or confining, and that various rearrangements of parts and modifications of structural detail may be resorted to without departing from the scope or spirit of the invention as herein claimed.

Having described the invention, what is claimed and desired to be secured by Letters Patent is:

1. A tool for separating two grooved members from their seats comprising a body plate having a recessed face and a central threaded opening, a screw therefor adapted to engage an element forming a seat for one of the grooved members, a pair of engaging elements rotatably supported in the said body plate and endwise adjustable therein, a key in the end of each engaging element adapted to engage the recess in the body plate, a flattened sphere formed at the outer end of each engaging element adapted to engage the said recessed members.

2. The method of separating the races of an anti-friction bearing from their respective seats comprising arranging the bearing members in aggroupment between the races, locking pulling members between and in engagement with the races and exerting sufficient force on the said pulling members to remove the races as a unit from their seats.

3. The method of separating the races of an anti-friction bearing from their respective seats comprising inserting pulling members between the races and bearing members, locking said pulling members in engagement with said races, and exerting sufficient force on said pulling members to remove said races from their seats.

4. A tool comprising a body member and a plurality of fingers rotatably supported by said member, said fingers having flattened spherical outer ends.

5. A tool comprising a body member, a spindle adjustable therethrough and a plurality of fingers rotatably mounted in said body member, said fingers having flattened spherical outer ends.

6. In a tool, a body member and a plurality of fingers extending therethrough and mounted for rotation about their longitudinal axes, the outer end of each finger having a large and small transverse dimension and provided with curved surfaces at the ends of the greater dimension.

7. In a tool, a body member and a plurality of fingers extending therethrough and mounted for rotation about their longitudinal axes, the outer end of each finger having a large and small transverse dimension and provided with surfaces of revolution at the ends of the greater dimension.

In testimony whereof I hereunto affix my signature this 29th day of November, 1926

JAMES W. HOWELL.